(12) United States Patent
Tsai et al.

(10) Patent No.: US 9,838,688 B2
(45) Date of Patent: Dec. 5, 2017

(54) METHOD AND APPARATUS OF ADAPTIVE INTRA PREDICTION FOR INTER-LAYER AND INTER-VIEW CODING

(71) Applicant: MEDIATEK INC., Hsin-Chu (TW)

(72) Inventors: Chia-Yang Tsai, Hsinchu County (TW); Tzu-Der Chuang, Hsinchu County (TW); Ching-Yeh Chen, Taipei (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 397 days.

(21) Appl. No.: 14/408,947

(22) PCT Filed: Apr. 25, 2013

(86) PCT No.: PCT/CN2013/074686
§ 371 (c)(1),
(2) Date: Dec. 17, 2014

(87) PCT Pub. No.: WO2013/189205
PCT Pub. Date: Dec. 27, 2013

(65) Prior Publication Data
US 2015/0341636 A1    Nov. 26, 2015

Related U.S. Application Data

(60) Provisional application No. 61/662,970, filed on Jun. 22, 2012.

(51) Int. Cl.
*H04N 19/105* (2014.01)
*H04N 19/593* (2014.01)
(Continued)

(52) U.S. Cl.
CPC ......... *H04N 19/105* (2014.11); *H04N 19/136* (2014.11); *H04N 19/186* (2014.11);
(Continued)

(58) Field of Classification Search
CPC .... H04N 19/105; H04N 19/597; H04N 19/70; H04N 19/186; H04N 19/593; H04N 19/136; H04N 19/30
See application file for complete search history.

(56) References Cited

U.S. PATENT DOCUMENTS

2006/0120450 A1* 6/2006 Han ............ H04N 19/176
375/240.03
2006/0209959 A1 9/2006 Sun
(Continued)

FOREIGN PATENT DOCUMENTS

CN    1585495 A    2/2005
CN    1863317 A    11/2006
(Continued)

OTHER PUBLICATIONS

Merkle, P., et al.; "Efficient Prediction Structures for Multiview Video Coding;" IEEE Transactions on Circuits and Systems for Video Technology; vol. 17; No. 11; Nov. 2007; pp. 1461-1473.
(Continued)

*Primary Examiner* — Kate Luo
(74) *Attorney, Agent, or Firm* — McClure, Qualey & Rodack, LLP (57) ABSTRACT

A method and apparatus of inter-layer and the inter-view adaptive Intra prediction (IL-AIP and IV-AIP) for a video coding system are disclosed. The video data is configured into a Base Layer (BL) and an Enhancement Layer (EL) for the inter-layer video coding system, and the video data is configured into a Base View (BV) and an Enhancement View (EV) for the inter-view video coding system. The adaptive Intra predictor for the to-be-processed block in the EL or the EV is derived based on the BL or the BV. For inter-layer and inter-view adaptive LM Intra prediction, the LM adaptive Intra predictor for the to-be-processed chroma
(Continued)

block in the EL or the EV is derived based on the BL or the BV.

25 Claims, 10 Drawing Sheets

(51) Int. Cl.
  *H04N 19/186* (2014.01)
  *H04N 19/597* (2014.01)
  *H04N 19/70* (2014.01)
  *H04N 19/30* (2014.01)
  *H04N 19/136* (2014.01)

(52) U.S. Cl.
  CPC .......... *H04N 19/30* (2014.11); *H04N 19/593* (2014.11); *H04N 19/597* (2014.11); *H04N 19/70* (2014.11)

(56) References Cited

U.S. PATENT DOCUMENTS

| | | | | |
|---|---|---|---|---|
| 2009/0097558 | A1* | 4/2009 | Ye | H04N 19/176 375/240.13 |
| 2010/0165077 | A1* | 7/2010 | Yin | H04N 19/597 348/42 |
| 2011/0007801 | A1* | 1/2011 | Andersson | H04N 19/176 375/240.14 |
| 2012/0050481 | A1* | 3/2012 | Chen | H04N 13/0066 348/46 |
| 2012/0106636 | A1* | 5/2012 | Kim | H04N 19/176 375/240.12 |

FOREIGN PATENT DOCUMENTS

| | | |
|---|---|---|
| CN | 101796841 A | 8/2010 |
| WO | 2006075240 A1 | 7/2006 |
| WO | 2008007342 A2 | 1/2008 |
| WO | WO 2008071037 | 6/2008 |
| WO | WO 2011/042440 | 4/2011 |
| WO | 2012012584 A1 | 1/2012 |

OTHER PUBLICATIONS

Marquant, G., et al.; "Extended Spatial Scalability for Non Dyadic Video Formats: from SDTV to HDTV;" Visual Communications and Image Processing; 2005; pp. 547-558.

Reichel, J., et al.; "Joint Scalable Video Model JSVM Text;" Joint Video Team (JVT) of ISO/IEC MPEG & ITU-T VCEG (ISO/IEC JTC1/SC29/WG11 and ITU-T SG16 Q.6); Oct. 2007; pp. 1-114.

Wang, Y., et al.; "Content-Adaptive Spatial Scalability for Scalable Video Coding;" 28th Picture Coding Symposium; Dec. 2010; pp. 226-229.

Francois, E., et al.; "A Generalization of Spatial Scalability for SVC Extension of AVC H.264;" pp. 1-6.

Choi, H., et al.; "Scalable Structures and Inter-Layer Predictions for HEVC Scalable Extension;" Joint Collaborative Team on Video Coding (JCT-VC) of ITU-T SG16 WP3 and ISO/IEC JTC1/SC29/WG11; Jul. 2011; pp. 1-12.

Segall, C.A., et al.; "Spatial Scalability Within the H.264 AVC Scalable Video Coding Extension;" IEEE Transactions on Circuits and Systems for Video Technology; vol. 17; No. 9; Sep. 2007; pp. 1121-1135.

* cited by examiner

METHOD AND APPARATUS OF ADAPTIVE INTRA PREDICTION FOR INTER-LAYER AND INTER-VIEW CODING

CROSS REFERENCE TO RELATED APPLICATIONS

The present invention claims priority to U.S. Provisional Patent Application, No. 61/662,970, filed on Jun. 22, 2012, entitled "Adaptive Intra Prediction". The U.S. Provisional Patent Applications hereby incorporated by reference in its entirety.

TECHNICAL FIELD

The present invention relates to video coding. In particular, the present invention relates to Intra prediction techniques for inter-layer and inter-view coding.

BACKGROUND

Video streaming has become a mainstream for video delivery today. Supported by the high-speed ubiquitous internet as well as mobile networks, video contents can be delivered to end users for viewing on different platforms with different qualities. In order to fulfill different requirements for various video stream applications, a video source may have to be processed or stored at different resolutions, frame rates, and/or qualities. It would result in fairly complicated system and require high overall bandwidth or large overall storage space. One solution to satisfy requirements for different resolutions, frame rates, qualities and/or bitrates is scalable video coding. Beside various proprietary development efforts to address this problem, there is also an existing video standard for scalable video coding. The joint video team (JVT) of ISO/IEC MPEG and ITU-T VCEG has standardized a Scalable Video Coding (SVC) extension to the H.264/AVC standard. An H.264/AVC SVC bitstream can contain video information ranging from low frame-rate, low resolution and low quality to high frame rate, high definition and high quality. This single bitstream can be adapted to a specific application by properly configuring the scalability of the bitstream. For example, the complete bitstream corresponding to a high definition video can be delivered over high-speed networks to provide full quality intended for viewing on large screen TV. A portion of the bitstream corresponding to a low-resolution version of the high definition video can be delivered over legacy cellular networks for intended viewing on handheld/mobile devices. Accordingly, a bitstream generated using H.264/AVC SVC is suitable for various video applications such as video broadcasting, video streaming, and surveillance.

In SVC, three types of scalabilities, i.e., temporal scalability, spatial scalability, and quality scalability are provided. SVC uses a multi-layer coding structure to render three dimensions of scalability. The concept of SVC is to generate one scalable bitstream that can be easily and quickly adapted to fit the bit-rate of various transmission channels, diverse display capabilities, and/or different computational resources without the need of transcoding or re-encoding. An important feature of SVC design is to provide scalability at the bitstream level. Bitstreams for a reduced spatial and/or temporal resolution can be simply obtained by discarding NAL units (or network packets) that are not required for decoding the target resolution. NAL units for quality refinement can be additionally truncated in order to reduce the bit-rate and/or the corresponding video quality.

In the H.264/AVC SVC extension, spatial scalability is supported based on the pyramid coding. First, the video sequence is down-sampled to smaller pictures with different spatial resolutions (layers). The lowest layer (i.e., the layer with lowest spatial resolution) is called a base layer (BL). Any layer above the base layer is called an enhancement layer (EL). In addition to dyadic spatial resolution, the H.264/AVC SVC extension also supports arbitrary resolution ratios, which is called extended spatial scalability (ESS). In order to improve the coding efficiency of the enhancement layers (video layers with larger resolutions), various inter-layer prediction schemes have been disclosed in the literature. Three inter-layer prediction tools have been adopted in SVC, including inter-layer motion prediction, inter-layer Intra prediction and inter-layer residual prediction (e.g., C. Andrew Segall and Gary J. Sullivan, "Spatial Scalability Within the H.264/AVC Scalable Video Coding Extension", IEEE Transactions on Circuits and Systems for Video Technology, Vol. 17, No. 9, Pages 1121-1135, September 2007).

Figure 1:
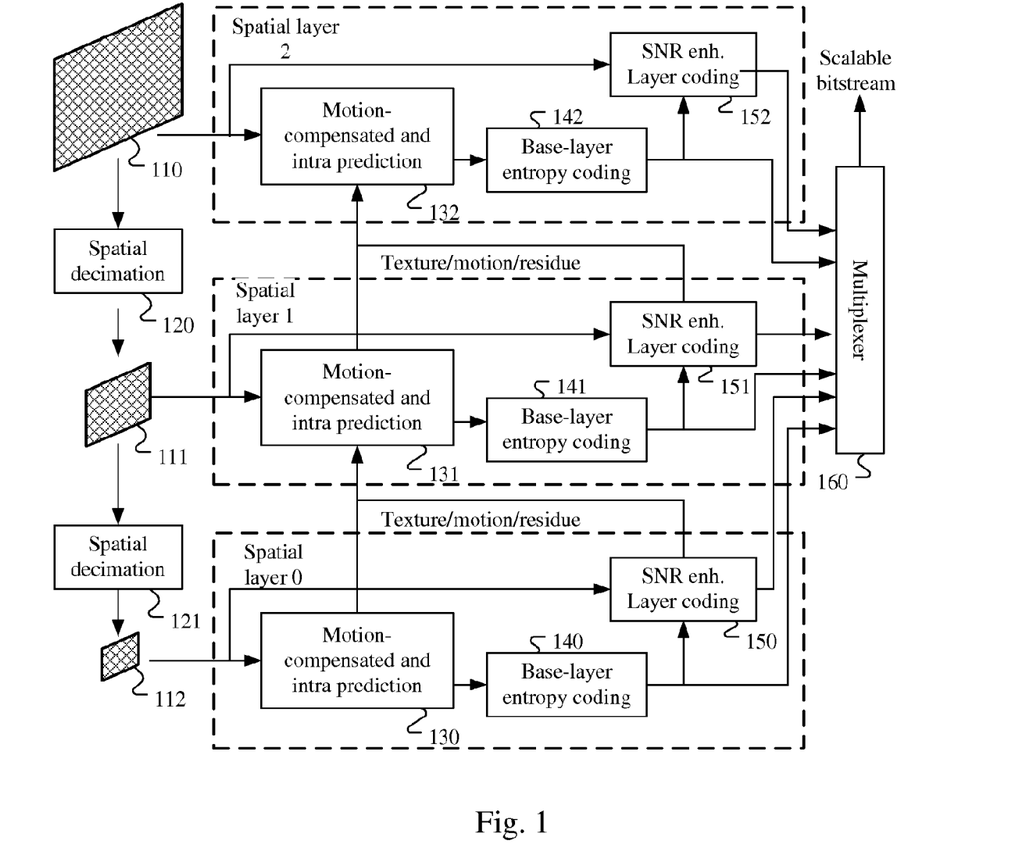
FIG. 1 illustrates an example of a combined scalable video coding system that provides spatial scalability as well as quality scalability, where three spatial layers are provided.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151. Similarly, layer-2 pictures 110 can be coded by motion-compensated and Intra prediction 132, base layer entropy coding 142 and SNR enhancement layer coding 152. The coding efficiency can be improved due to inter-layer coding. Furthermore, the information required to code spatial layer 1 may depend on reconstructed layer 0 (inter-layer prediction). Higher spatial resolution layers such as layer 1 and layer 2 are termed as the enhancement layers (EL). The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the base layer (BL). If base_mode_flag is equal to 1, the partitioning data of the EL macroblock together with the associated reference indexes and motion vectors are derived from the corresponding data of the collocated 8×8 block in the BL. The reference picture index of the BL is directly used in EL. The motion vectors of EL are scaled from the data associated with the BL. Besides, the scaled BL motion vector can be used as an additional motion vector predictor for the EL.

Inter-layer residual prediction uses the up-sampled BL residual information to reduce the information of EL residuals. The collocated residual of BL can be block-wise up-sampled using a bilinear filter and can be used as prediction for the residual of a current macroblock in the EL. The up-sampling of the reference layer residual is done on a transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be restricted to only Intra-coded macroblocks in the BL.

In the emerging High Efficiency Video Coding (HEVC) standard, Intra prediction has more modes to use. For example, 35 Intra modes (mode 0 to mode 34) are used for 8×8, 16×16, 32×32 and 64×64 prediction units (PUs) of the luma component. The 35 Intra prediction modes include DC mode, Planar mode, and 33 directional prediction modes. For the chroma component, a new Intra prediction mode, called LM mode, is used. The rationale of LM mode is that, usually there is some correlation between the luma component and the chroma component. Accordingly, the LM mode uses reconstructed Intra-coded luma block to form prediction for a chroma block. Furthermore, previously reconstructed surrounding pixels of a collocated luma block and previously reconstructed surrounding pixels of a current chroma block are used to derive parameters of the LM Intra prediction based on a least-squares criterion. The LM mode predictor for the chroma pixel at pixel location (x, y) is denoted as $Pred_c(x,y)$. The collocated reconstructed luma pixel is denoted as $Rec'L(x,y)$. The relationship between $Pred_c(x,y)$ and $Rec'L(x,y)$ is described by equation (1):

$$Pred_c(x,y) = \alpha \cdot Rec'L(x,y) + \beta, \quad (1)$$

where $\alpha$ and $\beta$ are the parameters of the LM Intra prediction and can be derived by using a least-squares method.

Figure 2A:
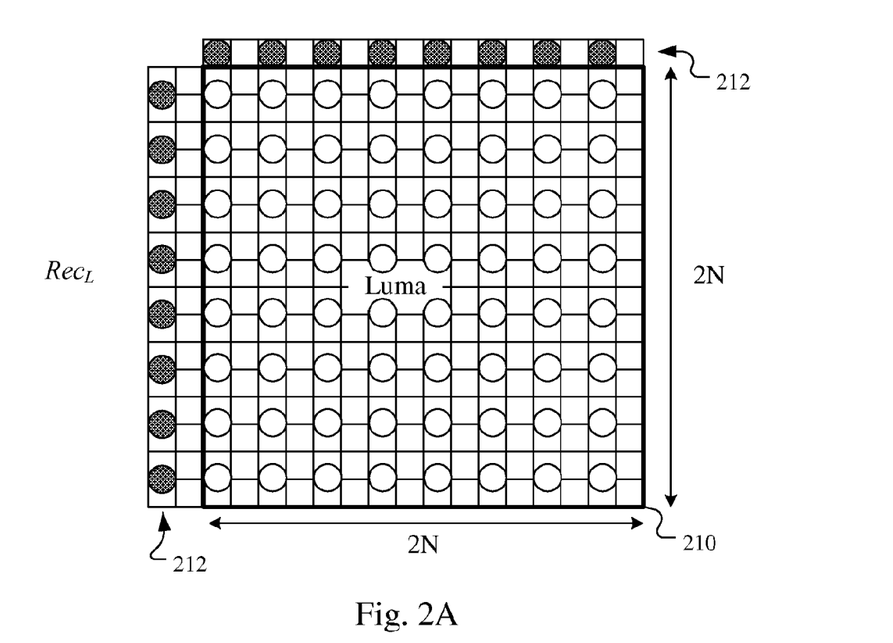
FIGS. 2A-B illustrate an example of deriving Intra prediction for chroma samples based on collocated luma samples, where boundary luma pixels and boundary chroma pixels are used to derive prediction parameters.
Figure 2B:
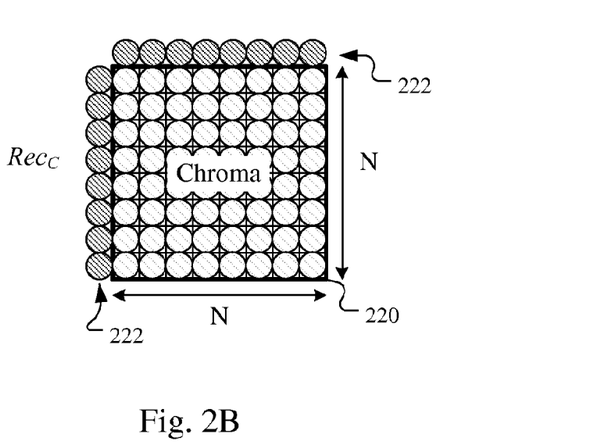

FIGS. 2A-B illustrate an example of the LM prediction process. First, the neighboring reconstructed pixels 212 of a collocated luma block 210 in FIG. 2A and the neighboring reconstructed pixels 222 of a chroma block 220 in FIG. 2B are used to evaluate the correlation between the blocks. The parameters of the LM Intra prediction are derived accordingly. Then, the predicted pixels of the chroma block are generated from the reconstructed pixels of the luma block (i.e., a luma prediction unit or luma PU) using the derived parameters. In the parameters derivation, the first above reconstructed pixel row and the second left reconstructed pixel column of the current luma block are used. The specific row and column of the luma block are used in order to match the 4:2:0 sampling format of the chroma components. The following illustration is based on 4:2:0 sampling format. LM-mode chroma Intra prediction for other sampling formats can be derived similarly. The collocated boundary pixels 212 of the luma PU 210, as shown in FIG. 2A, are collected and boundary pixels 222 of the chroma PU 220, as shown in FIG. 2B, are also collected. By using a least-squares method, the linear relationship between these two sets can be derived. In other words, $\alpha$ and $\beta$ can be derived based on luma and chroma boundary pixels. Besides, two short-tap sampling filters, [1,2,1] and [1,1], may be applied to those sampled horizontal and vertical luma boundary pixels, respectively.

The conventional Intra prediction does not address Intra prediction for inter-layer. It is desirable to extend Intra prediction to scalable video coding to improve the coding performance.

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of correlation of video data associated with multiple views and depth maps.

Figure 3:
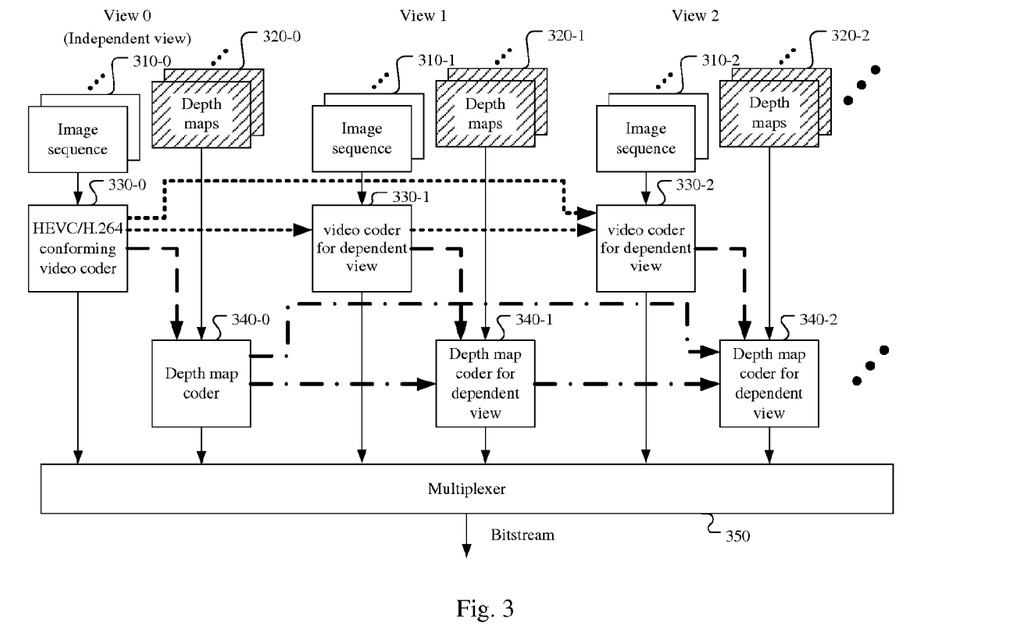
FIG. 3 illustrates an example of prediction structure for a 3D video coding system based on HEVC/H.264 standard.

FIG. 3 illustrates generic prediction structure for 3D video coding. The incoming 3D video data consists of images (310-0, 310-1, 310-2, . . . ) corresponding to multiple views. The images collected for each view form an image sequence for the corresponding view. Usually, the image sequence 310-0 corresponding to a base view (also called an independent view) is coded independently by a video coder 330-0 conforming to a video coding standard such as H.264/AVC or HEVC (High Efficiency Video Coding). The video coders (330-1, 330-2, . . . ) for image sequences associated with dependent views (i.e., views 1, 2, . . . ) which are also called enhancement views further utilize inter-view prediction in addition to temporal prediction. The inter-view predictions are indicated by the short-dashed lines in FIG. 3.

In order to support interactive applications, depth maps (320-0, 320-1, 320-2, . . . ) associated with a scene at respective views are also included in the video bitstream. In order to reduce data associated with the depth maps, the depth maps are compressed using depth map coder (340-0, 340-1, 340-2, . . . ) and the compressed depth map data is included in the bit stream as shown in FIG. 3. A multiplexer 350 is used to combine compressed data from image coders and depth map coders. The depth information can be used for synthesizing virtual views at selected intermediate viewpoints.

As shown in FIG. 3, the conventional 3D video coding system does not take into consideration of an inter-view correlation for Intra prediction. It is desirable to extend Intra prediction to 3D video coding to improve the coding performance.

SUMMARY

A method and apparatus of inter-layer adaptive Intra prediction (IL-AIP) and the inter-view adaptive Intra prediction (IV-AIP) for a video coding system are disclosed. The video data is configured into a Base Layer (BL) and an Enhancement Layer (EL) for the inter-layer video coding system, and the video data is configured into a Base View (BV) and an Enhancement View (EV) for the inter-view video coding system. In one embodiment according to the present invention, the method comprises receiving a to-be-processed block in the EL or the EV; determining a collocated block in the BL or the BV; deriving an adaptive Intra predictor for the to-be-processed block in the EL or the EV based on the BL or the BV; and applying Intra prediction encoding or decoding to the to-be-processed block in the EL or the EV using the adaptive Intra predictor. The collocated block is located at a location in the BL or the BV corresponding to the to-be-processed block in the EL or in the EV, and the collocated block is Intra coded. The location of the collocated block in the BV corresponding to the to-be-processed block in the EV is derived based on depth information of the BV, the EV or both the BV and the EV. The "collocated block" mentioned in the present invention for 3D video coding is also called "corresponding block".

Embodiments of the present invention also address various aspects of adaptive Intra predictor. The adaptive Intra predictor may correspond to a polynomial function or a linear function of pixel data of the collocated block. For the linear function, the parameters can be derived based on a least-squares method using two pixel sets corresponding to a prediction set (PS) associated with the EL or the EV and a collocated set (CS) associated with the BL or the BV. The PS is formed by sampling boundary pixels of the EL or the EV and the CS is formed by sampling boundary pixels of the BL or the BV. Sampling filter can be applied to the PS, the CS or both before said deriving the adaptive Intra predictor for the to-be-processed block in the EL or the EV based on pixel data of the BL or the BV. Sampling positions of the CS may depend on spatial resolution ratio of the EL to the BL or the spatial resolution ratio of the EV to the BV. Alternatively, the sampling positions of the CS may depend on depth information of the BV, the EV or both of the BV and the EV. Various flags can be signaled to indicate whether the IL-AIP or the IV-AIP is enabled, whether the IL-ATP/IV-ATP or convention Intra prediction is used, or whether the IL-AIP/IV-AIP or one of other coding modes is used.

The IL-AIP/IV-AIP method is also applied to LM Intra prediction mode for an inter-layer or inter-view coding system. The method comprises receiving a to-be-processed chroma block in the EL or the EV; determining a collocated luma block in the EL or the EV; deriving an LM adaptive Intra predictor for the to-be-processed chroma block in the EL or the EV based on the BL or the BV; and applying Intra prediction encoding or decoding to the to-be-processed chroma block in the EL or the EV using the LM adaptive Intra predictor. The collocated luma block is located at a location corresponding to the to-be-processed chroma block in the EL or in the EV and the collocated luma block is Intra coded. In one embodiment, parameters of the LM adaptive Intra predictor are derived based on the BL, the EL or both of the BL and the EL, or based on the BV, the EV or both the BV and the EV. In another embodiment, parameters of the LM adaptive Intra predictor are derived based on a reconstructed luma block and a reconstructed chroma block in the BL or the BV, wherein the reconstructed luma block and the reconstructed chroma block in the BL or the BY are located at corresponding locations of the collocated luma block and the to-be-processed chroma block in the EL or the EV respectively. In yet another embodiment, the first parameters are used as the parameters of the LM adaptive Intra predictor for the to-be-processed chroma block in the EL or the EV if an LM Intra prediction mode having first parameters is used for the BL or the BV.

DETAILED DESCRIPTION

Figure 4:
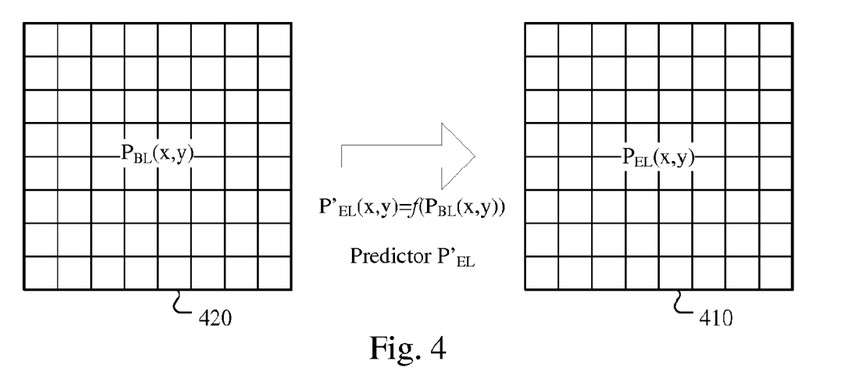
FIG. 4 illustrates a general concept of inter-layer adaptive Intra prediction according to the present invention.

In the present invention, information between layers is used for coding the EL in a scalable video coding system. One embodiment of the present invention is called inter-layer adaptive Intra prediction (IL-AIP). The basic concept of IL-AIP is illustrated in FIG. 4, where $P_{EL}(x,y)$ is the pixel at location (x,y) for a to-be-predicted block 410 in the EL and $P_{BL}(x,y)$ is the pixel of a collocated block 420 in the BL. Since the EL and the BL usually have very high correlation, the predictor $P'_{EL}(x,y)$ for $P_{EL}(x,y)$ can be generated by a mapping function $f(\cdot)$ of $P_{BL}(x,y)$. Examples of generating the predictor are illustrated as follows to address different aspects related to the present invention.

EXAMPLE A

Mapping Function for Predictor Generation

For a to-be-predicted pixel $P_{EL}(x,y)$ in the EL, the predictor is derived from the collocated pixel $P_{BL}(x,y)$ in the BL by a mapping function $f(\cdot)$. The mapping function can be either non-linear or linear. The mapping function can be derived from the edge orientations or the magnitude histogram related to $P_{BL}(x,y)$. Besides, the mapping function can also be formed as a polynomial equation given by:

$$P'_{EL}(x, y) = f(P_{BL}(x, y)) = \sum_{n=0}^{N} a_n (P_{BL}(x, y))^n, \quad (2)$$

where $a_n$ is the weighting factor for the n-th order term. In general, $a_n$ can be derived using regression analysis. Equation (2) can be further simplified as:

$$P'_{EL}(x,y) = f(P_{BL}(x,y)) = \alpha \cdot P_{BL}(x,y) + \beta, \quad (3)$$

in order to save system cost, where $\alpha$ and $\beta$ can be derived by a least-squares method from two sets of pixels related to $P_{EL}(x,y)$ and $P_{BL}(x,y)$ respectively. The parameters, $\alpha$ and $\beta$ in equation (3) can be derived similar to the least-squares method used in the LM mode of HEVC.

If the spatial resolution ratio of BL to EL is not 1:1, the up-sampled results of the BL, i.e., $P'B_L(x,y)$ is used as the input of the mapping function. In this case, equations (2) and (3) are modified as:

$$P'_{EL}(x, y) = f(P'_{BL}(x, y)) = \sum_{n=0}^{N} a_n (P'_{BL}(x, y))^n, \quad (4)$$

and $$P'_{EL}(x, y) = f(P'_{BL}(x, y)) = \alpha \cdot P'_{BL}(x, y) + \beta. \quad (5)$$

EXAMPLE B

Sampling Method in BL for Prediction

Figure 5:
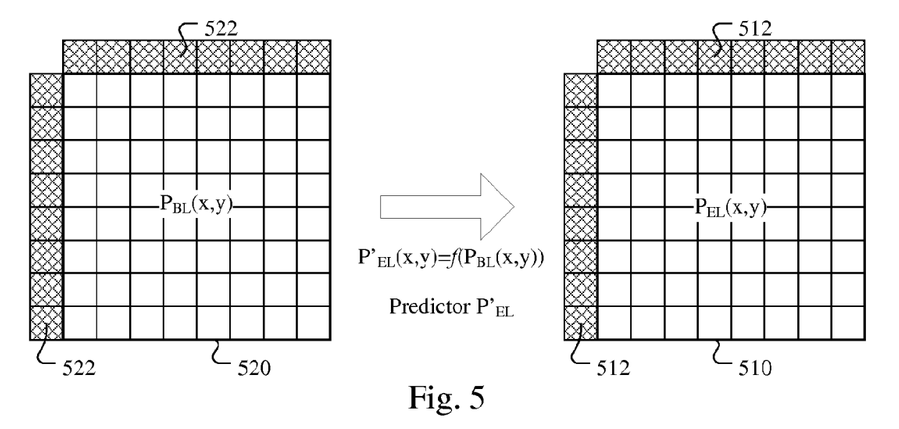
FIG. 5 illustrates an example of inter-layer adaptive Intra prediction according to an embodiment of the present invention, where the enhancement layer and the base layer have the same spatial resolution.

To derive the mapping functions mentioned in Example A, two pixel sets (prediction set and collocated set) are derived from the BL and the EL respectively. If the spatial resolution ratio of the BL and the EL is 1:1, the predicted set (PS) is formed by sampling the boundary pixels 512 around the to-be-predicted block 510 in the EL, and the collocated set (CS) is formed by sampling the boundary pixels 522 around the collocated block 520 in the BL as shown in FIG. 5. In this case, a 1:1 sampling is used to generate the CS from the boundary pixels of the collocated block in the BL. If no sampling filter is used, the boundary pixels of the collocated block can be used as the CS directly. After the PS and the CS are generated, the mapping functions mentioned in Example A can be derived based on the PS and the CS.

Figure 6:
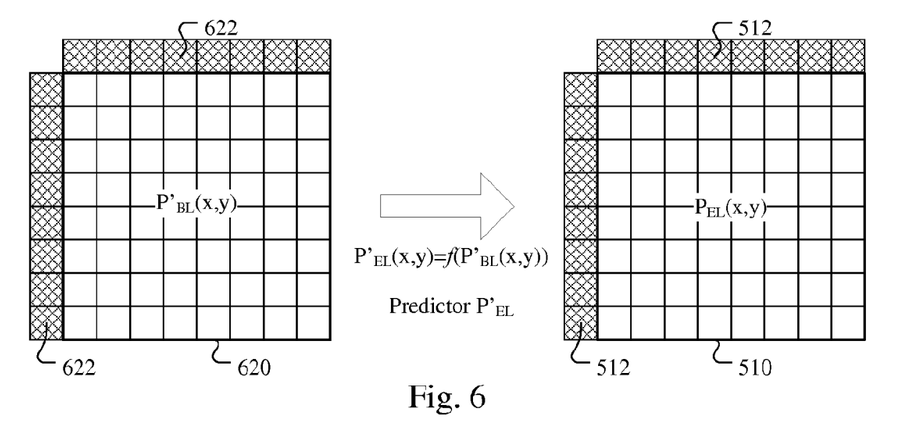
FIG. 6 illustrates an example of inter-layer adaptive Intra prediction according to an embodiment of the present invention, where the base layer has a lower spatial resolution than the enhancement layer and the BL is up-sampled for adaptive Intra prediction.

In some cases, the spatial resolutions of the BL and the EL are different. Usually, the BL picture has a lower resolution than the EL picture. The BL has to be up-sampled to match the resolution of the EL. Therefore, for any other ratio, the CS is formed by sampling the up-sampled $P'_{BL}$ as shown in FIG. 6. Accordingly, the up-sampled boundary pixels 622 around the up-sampled collocated block 620 in the BL are used to form the CS. Furthermore, the up-sampled pixel $P'_{BL}(x,y)$ for the collocated block is used as the input of the mapping function $f(\cdot)$ as shown in FIG. 6.

Figure 7:
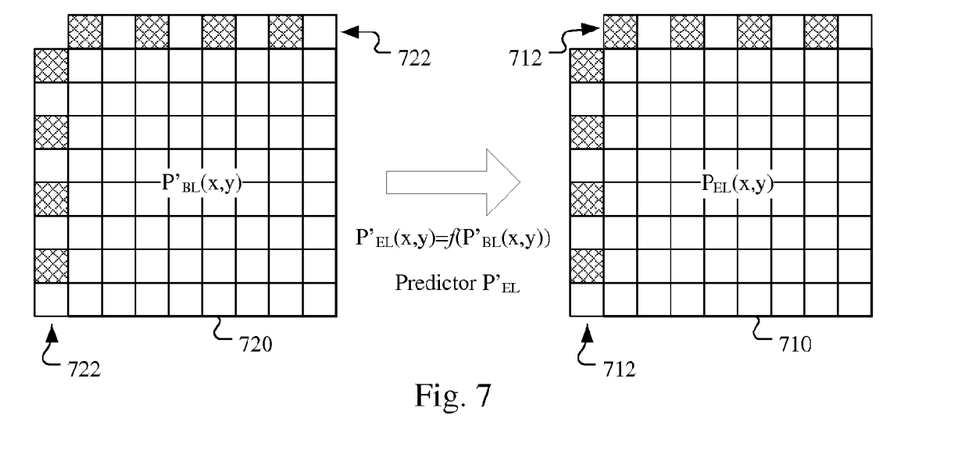
FIG. 7 illustrates an example of inter-layer adaptive Intra prediction according to an embodiment of the present invention, where the base layer has a lower spatial resolution than the enhancement layer and only the up-sampled BL at integer positions is used for adaptive Intra prediction.

For any ratio other than 1:1, another CS and PS derivation is disclosed. When the resolution ratio is not 1:1, the CS is derived from the up-sampled boundary pixels of the collocated block in the BL. Therefore, many artificial pixels are generated. Those artificially generated pixels may decrease the accuracy of the prediction. Accordingly, only the up-sampled pixels at integer position are used for the CS and the PS. FIG. 7 illustrates an example for the case of 1:2 spatial resolution ratio. In FIG. 7, every other pixel of the boundary pixels 712 around the to-be-predicted block 710 in the EL are used as the PS and every other pixel of the boundary pixels 722 around the collocated block 720 in the BL are used as the CS.

EXAMPLE C

Sampling Filter Design

To derive a more accurate mapping function for the predictor, the CS can be further filtered before IL-AIP predictor derivation. The purpose of the sampling filter is to reduce the artifacts induced during the quantization or up-sampling process. The sampling filter design is well known in the art. For example, a single short-tap FIR filter can be used for both horizontal and vertical boundary pixels in the CS. In another example, two separate short-tap FIR filters can be used for horizontal and vertical boundary pixels in the CS respectively. In the case of two separate sampling filters, the filter design is similar to the sampling filter design in HEVC LM mode. The sampling filter can be applied to the PS, the CS or both before deriving the adaptive Intra predictor; and the sampling filter can be an FIR, IIR or directional filter.

EXAMPLE D

Syntax Design

There are various aspects to take into consideration during syntax design according to embodiments of the present invention. Some examples are listed as follows.
1. IL-AIP is only activated when the processing layer is the EL. Accordingly, only bitstream associated with the EL has IL-AIP syntax.
2. The IL-AIP enable flag can be signaled in the layer level, picture level, slice level, largest coding unit (LCU) level, coding unit (CU) level, transform unit (TU) level, or prediction unit (PU) level to indicate whether IL-AIP is enabled or disabled.
3. For the PU or CU in the EL, one flag can be signaled to switch between IL-AIP and the conventional inter-layer Intra prediction as in H.264/AVC SVC.
4. For the PU or CU in the EL, one flag can be signaled to indicate whether IL-AIP or other prediction modes including Merge mode, Inter prediction modes, and other Intra prediction modes are used.
5. For the PU in the EL, one flag can be signaled to switch between IL-AIP and other Intra prediction modes.
6. For the PU in the EL, when IL-AIP is included as one of the most probable modes (MPM) and the PU is coded using IL-AIP, the Intra prediction mode for the PU is coded according to the MPM.
7. For the PU in the EL, when IL-AIP is not included as one of the most probable modes (MPM) and the PU is coded using IL-AIP, the Intra prediction mode for the PU is coded according to remaining modes.

The IL-AIP method disclosed above can be applied to a first component in the BL to predict a second component in EL, where the first component can be Y, Cb, Cr, or any combination of Y, Cb, and Cr, and the second component can be Y, Cb, or Cr.

Figure 8:
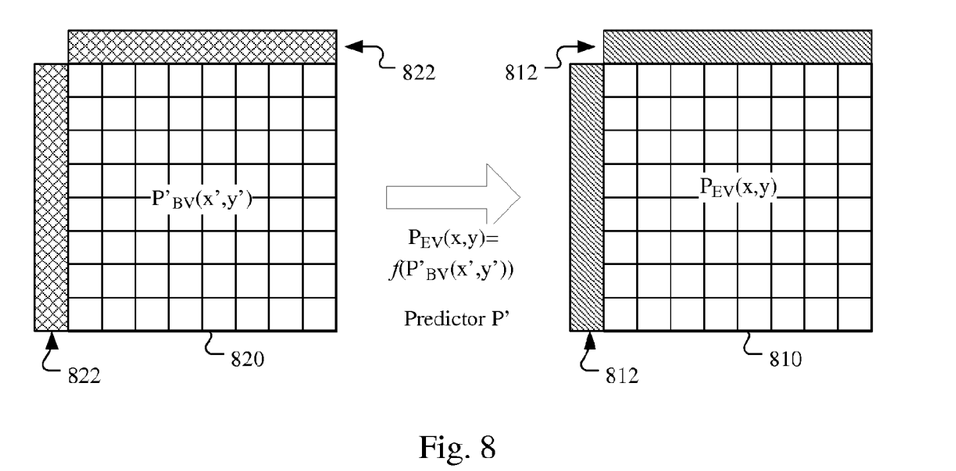
FIG. 8 illustrates a general concept of inter-view adaptive Intra prediction according to the present invention.

The IL-AIP method disclosed above can be applied to multi-view video coding. One embodiment of the present invention is called inter-view adaptive Intra prediction (IV-AIP). In inter-view adaptive Intra prediction (IV-AIP), the BL and the EL in IL-AIP are changed to the base view (i.e., BV, also called independent view) and the enhancement view (i.e., EV, also called dependent view) respectively, where the BV and the EV have the same spatial resolution. The collocated position in the EV can be derived according to the disparity vector which can be derived from inter-view texture information. Techniques of deriving collocated position based on the disparity vector and techniques of deriving the disparity vector based on inter-view texture information are known in the art and are not described herein. Furthermore, if the depth information is available, the collocated position in the EV can be derived using the depth information of the BV, the EV or both. In H.264/AVC based 3D video coding (3D-AVC), the depth information is coded before the texture information. Therefore, the collocated block can be derived according to the disparity vector or the depth information. In the HEVC based 3D video coding (3D-HEVC), if the texture information is coded before the depth information, a collocated block can be derived using the depth information of the BV. On the other hand, if the depth information is coded before the texture information, a collocated block can be derived using the depth information of the EV. FIG. 8 illustrates an example of IV-AIP according to the present invention, where the boundary pixels 812 around the to-be-predicted block 810 in the EV and the boundary pixels 822 around the collocated block 820 in the BV are used to derive parameters for the mapping function. Furthermore, in IV-AIP, the video data used in the BV may correspond to Y, Cb, or Cr, depth (D), or a combination thereof, and the video data in the EV can be Y, Cb, Cr, or D. Various aspects of the present invention as illustrated in examples A through example D for IL-AIP are also applicable to IV-AIP.

Other embodiments of the present invention address the LM Intra prediction of inter-layer and inter-view coding. The LM Intra prediction in HEVC uses the relationship between luma and chroma pixels to reduce the texture redundancies in the chroma component. In the present invention, the LM Intra prediction is applied to SVC. Three variations of inter-layer LM Intra prediction according to the present invention are disclosed.

Figure 9:
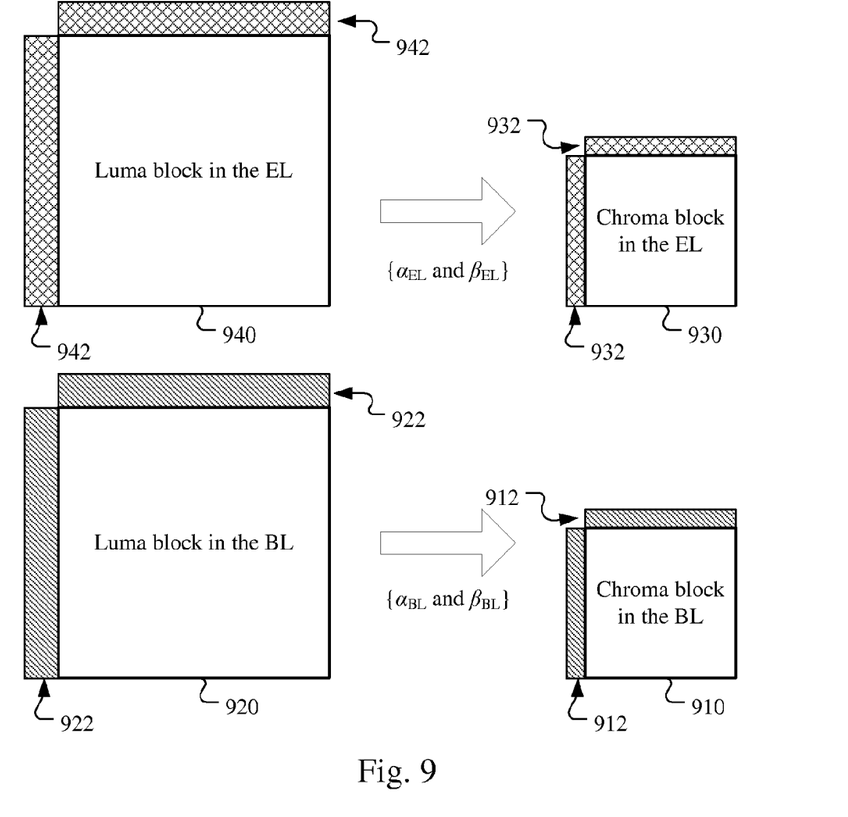
FIG. 9 illustrates an example of inter-layer adaptive LM Intra prediction according to an embodiment of the present invention, where the enhancement layer derives LM Intra prediction parameters according to the LM Intra prediction method of High Efficiency Vide Coding (HEVC).

The first embodiment of inter-layer LM Intra prediction applies the LM Intra predictions to the BL and the EL separately. The LM Intra prediction for the BL, as shown in FIG. 9, is the same as that in HEVC, where boundary pixels 922 of luma block 920 and the boundary pixels 912 of chroma block 910 in the BL are used to derive the two variables $\alpha_{BL}$ and $\beta_{BL}$ for generating the LM predictor for the to-be-processed block (i.e., block 910) in the BL. The same procedure is applied to the EL, where boundary pixels 942 of luma block 940 and boundary pixels 932 of chroma block 930 in the EL are used to derive the two variables $\alpha_{EL}$ and $\beta_{BL}$ for generating the LM predictor for the to-be-processed block (i.e., block 930) in the EL.

Figure 10:
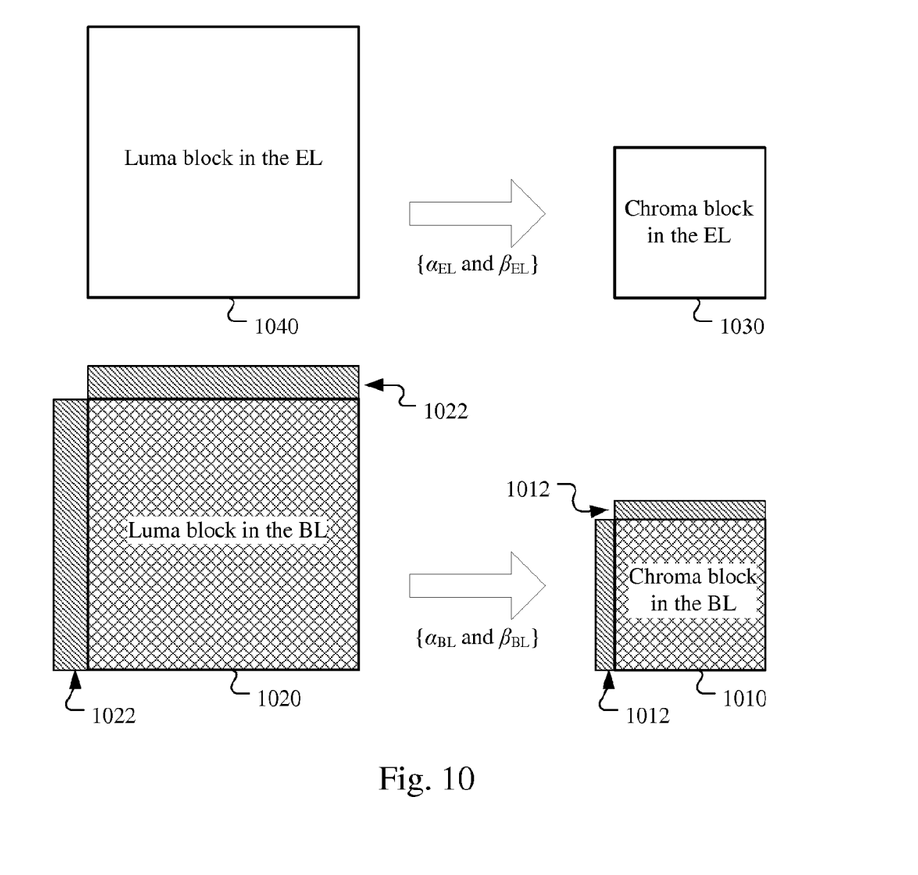
FIG. 10 illustrates an example of inter-layer adaptive LM Intra prediction according to an embodiment of the present invention, where the enhancement layer derives LM Intra prediction parameters based on reconstructed BL.

The second embodiment of inter-layer LM Infra prediction is shown in FIG. 10. For the BL, the LM Intra prediction is the same as that in HEVC. In other words, boundary pixels 1022 of luma block 1020 and boundary pixels 1012 of chroma block 1010 in the BL are used to derive the two variables $\alpha_{BL}$ and $\beta_{BL}$ for generating the LM predictor for the to-be-processed block (i.e., block 1010) in the BL. For the EL, since the BL reconstruction is done prior to the EL reconstruction, the derivation process of $\alpha_{EL}$ and $\beta_{EL}$ can directly use the reconstructed prediction blocks of luma and chroma (i.e., blocks 1020 and 1010) in the BL instead of respective boundary pixels of luma block 1040 and chroma block 1030 in the EL. Therefore, luma block 1020 and the chroma block 1010 in the BL are used to derive the two variables $\alpha_{BL}$ and $\beta_{BL}$ for generating the LM predictor for the to-be-processed block in the EL.

Figure 11:
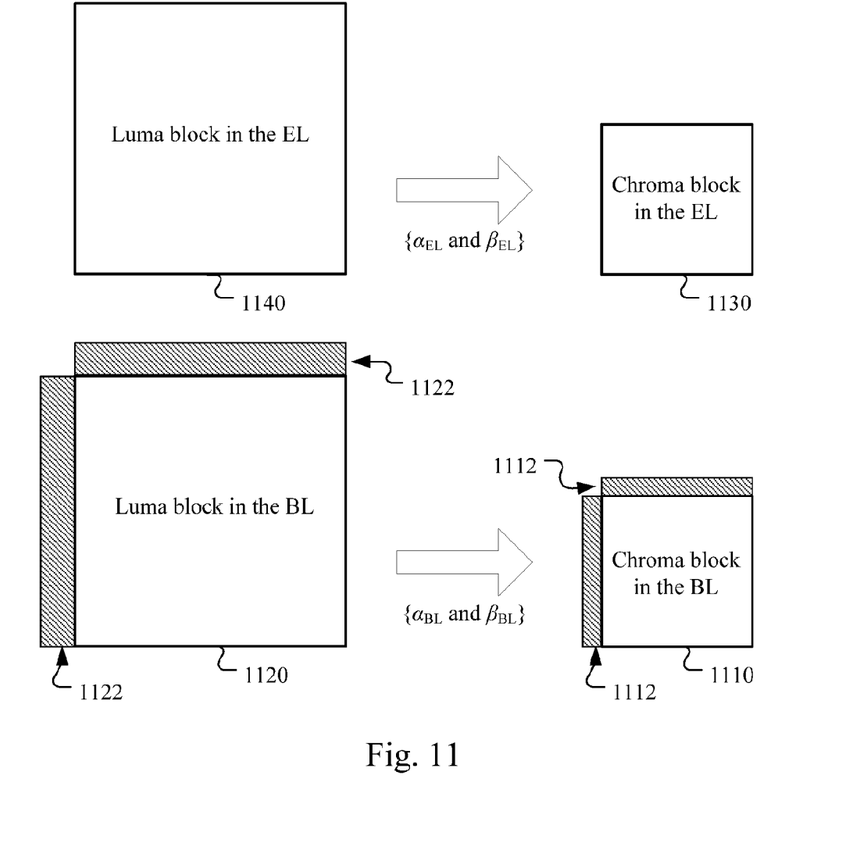
FIG. 11 illustrates an example of inter-layer adaptive LM Intra prediction according to an embodiment of the present invention, where the enhancement layer uses the same LM Intra prediction parameters derived for the BL.

The third embodiment of inter-layer LM Intra prediction is shown in FIG. 11. The derived parameters in the BL for the LM Intra prediction are reused for the LM Intra prediction in the EL. For the BL, the LM Intra prediction is the same as that in HEVC, where boundary pixels 1122 of luma block 1120 and boundary pixels 1112 of chroma block 1110 in the BL are used to derive the two parameters, $\alpha_{BL}$ and $\beta_{BL}$ for generating the LM predictor for the BL. For the EL, if the LM mode is enabled in the BL, the EL can use the LM parameters, $\alpha_{BL}$, and $\beta_{BL}$, in the BL directly for the LM Intra prediction in the EL. Accordingly, the to-be-predicted chroma block (i.e., block 1130) in the EL is predicted by collocated luma block (i.e., block 1140) in the EL using the LM Intra prediction parameters (i.e., $\alpha_{BL}$ and $\beta_{BL}$).

The LM Intra prediction for inter-layer video coding as described above can also be applied to multi-view video coding. In inter-view adaptive Intra prediction (IV-AIP), the BL and the EL in IL-AIP are changed to BV and EV respectively, where the BV and the EV have the same spatial resolution. The collocated position of a luma block corresponding to a to-be-processed chroma block in the EV can be derived using the disparity vector or the depth information associated with the BV, the EV, or both.

Figure 12:
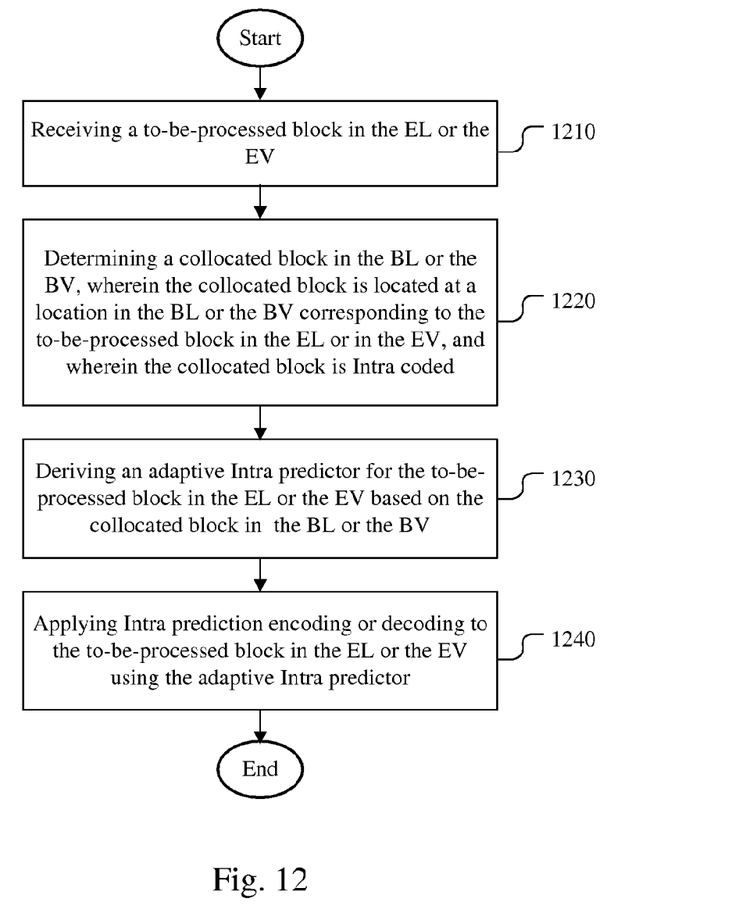
FIG. 12 illustrates an exemplary flowchart of a system incorporating inter-layer or inter-view adaptive Intra prediction.

The inter-layer adaptive Intra prediction (IL-AIP) and the inter-view adaptive Intra prediction (IV-AIP) described above can be used in a video encoder as well as a video decoder. FIG. 12 illustrates an exemplary flowchart of an encoder or a decoder incorporating an embodiment of the present invention, where video data is configured into a Base Layer (BL) and an Enhancement Layer (EL) for the inter-layer video coding system, and the video data is configured into a Base View (BV) and an Enhancement View (EV) for the inter-view video coding system. A to-be-processed block in the EL or the EV is received from a media or a processor as shown in step 1210. The to-be-processed block in the EL or the EV may be retrieved from a media such as a computer memory of buffer (RAM or DRAM). The to-be-processed block in the EL or the EV may also be received from a processor such as a central processing unit or a digital signal processor. In an encoder, the to-be-processed block corresponds to a block of pixel data in the EL or the EV to be coded. In a video decoder, the to-be-processed block corresponds to a block of coded pixel data in the EL or the EV to be decoded. The processor may generate the to-be-processed block from input video data in the encoder. And the processor may generate the to-be-processed block from a video bitstream in a decoder. A collocated block in the BL or the BV is determined in step 1220, where the collocated block is located at a location in the BL or the BV corresponding to the to-be-processed block in the EL or in the EV, and the collocated block is Intra coded. As mentioned previously, the technique for determining the collocated position is known in the field. An adaptive Intra predictor for the to-be-processed block in the EL or the EV based on the BL or the BV is derived in step 1230. Intra prediction encoding or decoding is then applied to the to-be-processed block in the EL or the EV using the adaptive Intra predictor in step 1240.

Figure 13:
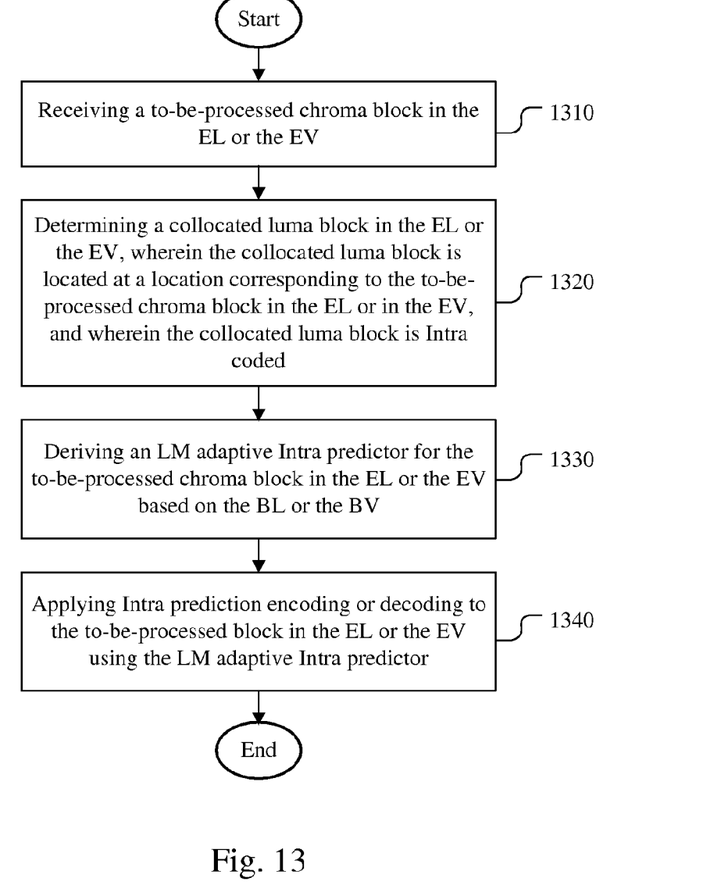
FIG. 13 illustrates an exemplary flowchart of a system incorporating inter-layer or inter-view adaptive LM Intra prediction.

The inter-layer adaptive Intra prediction (IL-AIP) and the inter-view adaptive Intra prediction (IV-AIP) using an LM Intra prediction mode described above can be used in a video encoder as well as a video decoder. FIG. 13 illustrates an exemplary flowchart of an encoder or a decoder incorporating an embodiment of the present invention, where video data is configured into a Base Layer (BL) and an Enhancement Layer (EL) for the inter-layer video coding system, and the video data is configured into a Base View (BV) and an Enhancement View (EV) for the inter-view video coding system. A to-be-processed chroma block in the EL or the EV is received from a media or a processor as shown in step 1310. The to-be-processed chroma block in the EL or the EV may be retrieved from a media such as a computer memory of buffer (RAM or DRAM). The to-be-processed chroma block in the EL or the EV may also be received from a processor such as a central processing unit or a digital signal processor. In an encoder, the to-be-processed chroma block corresponds to a block of chroma pixel data in the EL or the EV to be coded. In a video decoder, the to-be-processed chroma block corresponds to a block of coded chroma pixel data in the EL or the EV to be decoded. The processor may generate the to-be-processed chroma block from input video data in the encoder. And the processor may generate the to-be-processed chroma block from a video bitstream in a decoder. A collocated luma block in the EL or the EV is determined in step 1320, where the collocated luma block is located at a location corresponding to the to-be-processed chroma block in the EL or in the EV, and the collocated luma block is Intra coded. An LM adaptive Intra predictor for the to-be-processed chroma block in the EL or the EV based on the BL or the BV is derived in step 1330. Intra prediction encoding or decoding is then applied to the to-be-processed chroma block in the EL or the EV using the LM adaptive Intra predictor in step 1340.

The flowcharts shown above are intended to illustrate examples of inter-layer adaptive Intra prediction (IL-AIP) and the inter-view adaptive Intra prediction (IV-AIP) for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-layer or inter-view adaptive Intra prediction (IL-AIP or IV-AIP) for an inter-layer or inter-view video coding system, wherein video data is configured into a Base Layer (BL) and an Enhancement Layer (EL) for the inter-layer video coding system, and the video data is configured into a Base View (BV) and an Enhancement View (EV) for the inter-view video coding system, the method comprising:

receiving a to-be-processed block in the EL or the EV;

determining a collocated block in the BL or the BV, wherein the collocated block is located at a location in the BL or the BV corresponding to the to-be-processed block in the EL or in the EV, and wherein the collocated block is Intra coded;

deriving an adaptive Intra predictor for the to-be-processed block in the EL or the EV from the collocated block in the BL or the BV based on pixel data of the BL or the BV, wherein the adaptive Intra predictor corresponds to a linear function of pixel data in the collocated block according to $PL'_{EL/EV}(x,y)=\alpha P'_{BL/BV}(x,y)+\beta$, wherein $P'_{EL/EV}(x,y)$ corresponds to the adaptive Intra predictor for the to-be-processed block in the EL or the EV, $P'_{BL/BV}(x,y)$ corresponds to the pixel data of the collocated block in the BL or the BV, and $\alpha$ and $\beta$ are parameters, and wherein $\alpha$ and $\beta$ are derived based on a least-squares method using two pixel sets corresponding to a prediction set (PS) associated with the EL or the EV and a collocated set (CS) associated with the BL or the BV; and applying Intra prediction encoding or decoding to the to-be-processed block in the EL or the EV using the adaptive Intra predictor.

2. The method of claim 1, wherein the location of the collocated block in the BV corresponding to the to-be-processed block in the EV is derived based on depth information of the BV, the EV or both the BV and the EV.

3. The method of claim 1, wherein the adaptive Intra predictor corresponds to a polynomial function of pixel data of the collocated block, wherein the collocated block is up-sampled before applying the polynomial function if the BL or the BV has lower spatial resolution than the EL or the EV.

4. The method of claim 1, wherein the collocated block is up-sampled before applying the linear function if the BL or the BV has lower spatial resolution than the EL or the EV.

5. The method of claim 4, wherein the PS is formed by sampling first boundary pixels above the to-be-predicted block of the EL or the EV, and sampling second boundary pixels adjacent to the left of the to-be-predicted block of the EL or the EV, and the CS is formed by sampling third boundary pixels above the collocated block of the BL or the BV, and sampling fourth boundary pixels to the left of the collocated block of the BL or the BV.

6. The method of claim 5, wherein sampling positions of the CS depend on spatial resolution ratio of the EL to the BL or the spatial resolution ratio of the EV to the BV, or the sampling positions of the CS depend on depth information of the BY, the EV or both of the BV and the EV.

7. The method of claim 6, wherein the sampling positions of the CS correspond to integer positions of the BL or the BV if the EL or the EV has lower spatial resolution than the BL or the BV.

8. The method of claim 5, wherein sampling positions of the PS depend on spatial resolution ratio of the EL to the BL, or the spatial resolution ratio of the EV to the BV.

9. The method of claim 5, wherein sampling positions of the PS and the CS are the same.

10. The method of claim 5, wherein a sampling filter is applied to the PS, the CS or both before said deriving the adaptive Intra predictor for the to-be-processed block in the EL or the EV based on pixel data of the BL or the BV.

11. The method of claim 10, wherein two first sampling filters are applied to the first boundary pixels and the second boundary pixels separately, two second sampling filters are applied to the third boundary pixels and the fourth boundary pixels separately, or said two first sampling filters are applied to the first boundary pixels and the second boundary pixels separately and said two second sampling filters are applied to the third boundary pixels and the fourth boundary pixels separately.

12. The method of claim 1, wherein a flag is signaled in a layer level, a picture level, a slice level, a coding unit level, or a prediction unit level to indicate whether the IL-AIP or the IV-AIP is enabled for the to-be-processed block in the EL or the EV.

13. The method of claim 1, wherein a flag is signaled to indicated whether the to-be-processed block in the EL or the EV is processed based on the IL-AIP or the IV-AIP, or the to-be-processed block in the EL or the EV is processed based on convention Intra prediction, wherein the conventional Intra prediction corresponds to inter-layer Intra prediction of a scalable video coding, and the to-be-processed block corresponds to a prediction unit or a coding unit.

14. The method of claim 1, wherein a flag is signaled to indicate whether the to-be-processed block in the EL or the EV is processed based on the IL-AIP or the IV-AIP, or the to-be-processed block in the EL or the EV is processed using one of other prediction modes, said other prediction modes comprise Merge mode, Inter prediction mode, and other Intra prediction modes, and the to-be-processed block corresponds to a prediction unit or a coding unit.

15. The method of claim 1, wherein when an Intra prediction mode corresponding to the adaptive Intra predictor is included as one of most probable modes (MPM) and a current Intra prediction mode selected for the to-be-processed block is the Intra prediction mode corresponding to the adaptive Intra predictor, the current Intra prediction mode for the to-be-processed block is coded according to the MPM, wherein the to-be-processed block corresponds to a prediction unit.

16. The method of claim 1, wherein when an Intra prediction mode corresponding to the adaptive Intra predictor is not included as one of most probable modes (MPM) and a current Intra prediction mode selected for the to-be-processed block is the Intra prediction mode corresponding to the adaptive Intra predictor, the current Intra prediction mode for the to-be-processed block is coded according to one of remaining modes, wherein the to-be-processed block corresponds to a prediction unit.

17. The method of claim 1, wherein said deriving the adaptive Intra predictor for the to-be-processed block in the EL or the EV based on pixel data of the BL or the BV uses edge information associated with boundary pixels of the collocated block or up-sampled collocated block in the BL or the BV.

18. The method of claim 1, wherein said deriving the adaptive Intra predictor for the to-be-processed block in the EL or the EV based on pixel data of the BL or the BV uses magnitude histogram information associated with boundary pixels of the collocated block or up-sampled collocated block in the BL or the BV.

19. The method of claim 1, wherein the BL and the EL, or the BV and the EV correspond to a luma component, chroma component, or depth component of the video data.

20. A method of inter-layer or inter-view adaptive Intra prediction (IL-AIP or IV-AIP) for an inter-layer or inter-view video coding system, wherein video data is configured into a Base Layer (BL) and an Enhancement Layer (EL) for the inter-layer video coding system, and the video data is configured into a Base View (BV) and an Enhancement View (EV) for the inter-view video coding system, the method comprising:

receiving a to-be-processed chroma block in the EL or the EV;

determining a collocated luma block in the EL or the EV, wherein the collocated luma block is located at a location corresponding to the to-be-processed chroma block in the EL or in the EV, and wherein the collocated luma block is Intra coded;

deriving an LM adaptive Intra predictor for the to-be-processed chroma block in the EL or the EV based on the BL or the BV, wherein the adaptive Intra predictor corresponds to a linear function of pixel data in the collocated block according to $P'_{EL/EV}(x,y) = \alpha P'_{BL/BV}(x,y) + \beta$, wherein $P'_{EL/EV}(x,y)$ corresponds to the adaptive Intra predictor for the to-be-processed block in the EL or the EV, $P'_{BL/BV}(x,y)$ corresponds to the pixel data of the collocated block in the BL or the BV, and $\alpha$ and $\beta$ are parameters, and wherein $\alpha$ and $\beta$ are derived based on a least-squares method using two pixel sets corresponding to a prediction set (PS) associated with the EL or the EV and a collocated set (CS) associated with the BL or the BV; and applying Intra prediction encoding or decoding to the to-be-processed chroma block in the EL or the EV using the LM adaptive Intra predictor.

21. The method of claim 20, wherein parameters of the LM adaptive Intra predictor is derived based on the BL, the EL or both of the BL and the EL, or based on the BV, the EV or both the BV and the EV.

22. The method of claim 20, wherein parameters of the LM adaptive Intra predictor is derived based on a reconstructed luma block and a reconstructed chroma block in the BL or the BV, wherein the reconstructed luma block and the reconstructed chroma block in the BL or the BV are located at corresponding locations of the collocated luma block and the to-be-processed chroma block in the EL or the EV respectively.

23. The method of claim 20, wherein if an LM Intra prediction mode having first parameters is used for the BL or the BV, the first parameters are used as the parameters of the LM adaptive Intra predictor for the to-be-processed chroma block in the EL or the EV.

24. An apparatus for adaptive Intra prediction in an inter-layer or inter-view video coding system, wherein video data is configured into a Base Layer (BL) and an Enhancement Layer (EL) for the inter-layer video coding system, and the video data is configured into a Base View (BV) and an Enhancement View (EV) for the inter-view video coding system, the apparatus comprising at least one circuit configured for:

determining a to-be-processed block in the EL or the EV;

receiving a collocated block in the BL or the BV, wherein the collocated block is located at a location in the BL or the BV corresponding to the to-be-processed block in the EL or in the EV, and wherein the collocated block is Intra coded;

deriving an adaptive Intra predictor for the to-be-processed block in the EL or the EV from the collocated block in the BL or the BV based on pixel data of the BL or the BV, wherein the adaptive Intra predictor corresponds to a linear function of pixel data in the collocated block according to $P'_{EL/EV}(x,y) = \alpha P'_{BL/BV}(x,y) + \beta$, wherein $P'_{EL/EV}(x,y)$ corresponds to the adaptive Intra predictor for the to-be-processed block in the EL or the EV, $P'_{BL/BV}(x,y)$ corresponds to the pixel data of the collocated block in the BL or the BV, and $\alpha$ and $\beta$ are parameters, and wherein $\alpha$ and $\beta$ are derived based on a least-squares method using two pixel sets corresponding to a prediction set (PS) associated with the EL or the EV and a collocated set (CS) associated with the BL or the BV; and applying Intra prediction encoding or decoding to the to-be-processed block in the EL or the EV using the adaptive Intra predictor.

25. An apparatus for adaptive Intra prediction in an inter-layer or inter-view video coding system, wherein video data is configured into a Base Layer (BL) and an Enhancement Layer (EL) for the inter-layer video coding system, and the video data is configured into a Base View (BV) and an Enhancement View (EV) for the inter-view video coding system, the apparatus comprising at least one circuit configured for:

determining a to-be-processed chroma block in the EL or the EV;

receiving a collocated luma block in the EL or the EV, wherein the collocated luma block is located at a location corresponding to the to-be-processed chroma block in the EL or in the EV, and wherein the collocated luma block is Intra coded;

deriving an LM adaptive Intra predictor for the to-be-processed chroma block in the EL or the EV based on the BL or the BV, wherein the adaptive Intra predictor corresponds to a linear function of pixel data in the collocated block according to $P'_{EL/EV}(x,y) = \alpha P'_{BL/BV}(x,y) + \beta$, wherein $P'_{EL/EV}(x,y)$ corresponds to the adaptive Intra predictor for the to-be-processed block in the EL or the EV, $P'_{BL/BV}(x,y)$ corresponds to the pixel data of the collocated block in the BL or the BV, and $\alpha$ and $\beta$ are parameters, and wherein $\alpha$ and $\beta$ are derived based on a least-squares method using two pixel sets corresponding to a prediction set (PS) associated with the EL or the EV and a collocated set (CS) associated with the BL or the BV; and applying Intra prediction encoding or decoding to the to-be-processed block in the EL or the EV using the LM adaptive Intra predictor.

* * * * *